United States Patent [19]

Nagaoka et al.

[11] 4,171,136
[45] Oct. 16, 1979

[54] REPRODUCING APPARATUS FOR A DISK-SHAPED RECORDING MEDIUM

[75] Inventors: Tadashi Nagaoka, Nishinomiya; Izumi Hino, Daito, both of Japan

[73] Assignee: Matsushita Electric Industrial Co., Ltd., Osaka, Japan

[21] Appl. No.: 877,476

[22] Filed: Feb. 13, 1978

[30] Foreign Application Priority Data

Feb. 15, 1977 [JP] Japan .................................. 52-15649

[51] Int. Cl.² ............................ G11B 3/10; G11B 5/52
[52] U.S. Cl. ..................................... 274/23 A; 360/86
[58] Field of Search ................. 274/23 A; 360/86, 97, 360/98, 99

[56] References Cited

U.S. PATENT DOCUMENTS

| 2,457,712 | 12/1948 | Olson et al. | 274/1 R |
| 3,767,848 | 10/1973 | Schuller et al. | 274/23 A |
| 3,993,316 | 11/1976 | Fairbanks | 274/23 A |

FOREIGN PATENT DOCUMENTS

2250298  4/1974  Fed. Rep. of Germany.

*Primary Examiner*—Steven L. Stephan

[57] ABSTRACT

A reproducing apparatus for a disk-shaped recording medium, wherein a pickup detects signals from a rotating disk-shaped recording medium in contact with the latter. The reproducing apparatus is so constructed that vertical and horizontal movements of the pickup can be selectively made by actuating only one control knob, and that the horizontal movement of the pickup is prevented when the latter is in contact with the disk-shaped recording medium, even if the control knob is erroneously or accidentally actuated.

5 Claims, 6 Drawing Figures

REPRODUCING APPARATUS FOR A DISK-SHAPED RECORDING MEDIUM

The present invention relates to a reproducing device for a disk-shaped recording medium, wherein a single control knob is provided which controls the reproducing apparatus so that it selectively controls horizontal movement of a pickup to a predetermined position along a disk-shaped recording medium or, a start and stop operation of the reproduction device (including raising and lowering the pickup) without causing the simultaneous occurrence of both operations.

In a reproducing apparatus for a rotating disk-shaped recording medium having "for example" a spiral recording groove, one often desires to lift and rapidly move a pickup transversely across the recorded surface so as to reproduce signals from any desired position. However, should the pickup move across the recording surface while remaining in contact with the recording medium, both the pickup and the recording medium would be damaged.

In a known reproducing apparatus for a disk-shaped recording medium a plurality of control knobs are provided each controlling one of the above operations. However, a plurality of control knobs causes a complicated and troublesome control of the apparatus.

It is an object of the present invention to provide a reproducing apparatus for a disk-shaped recording medium which eliminates the above disadvantages so as to allow for a simplified control.

It is another object of the present invention to provide a reproducing apparatus for a disk-shaped recording medium having a single control knob which controls the reproducing apparatus to selectively cause either vertical or horizontal movements of a pickup without permitting the simultaneous occurrence of these movements, thereby inhibiting the horizontal movement of the pickup when it is in contact with a disk-shaped recording medium.

Figure 1:
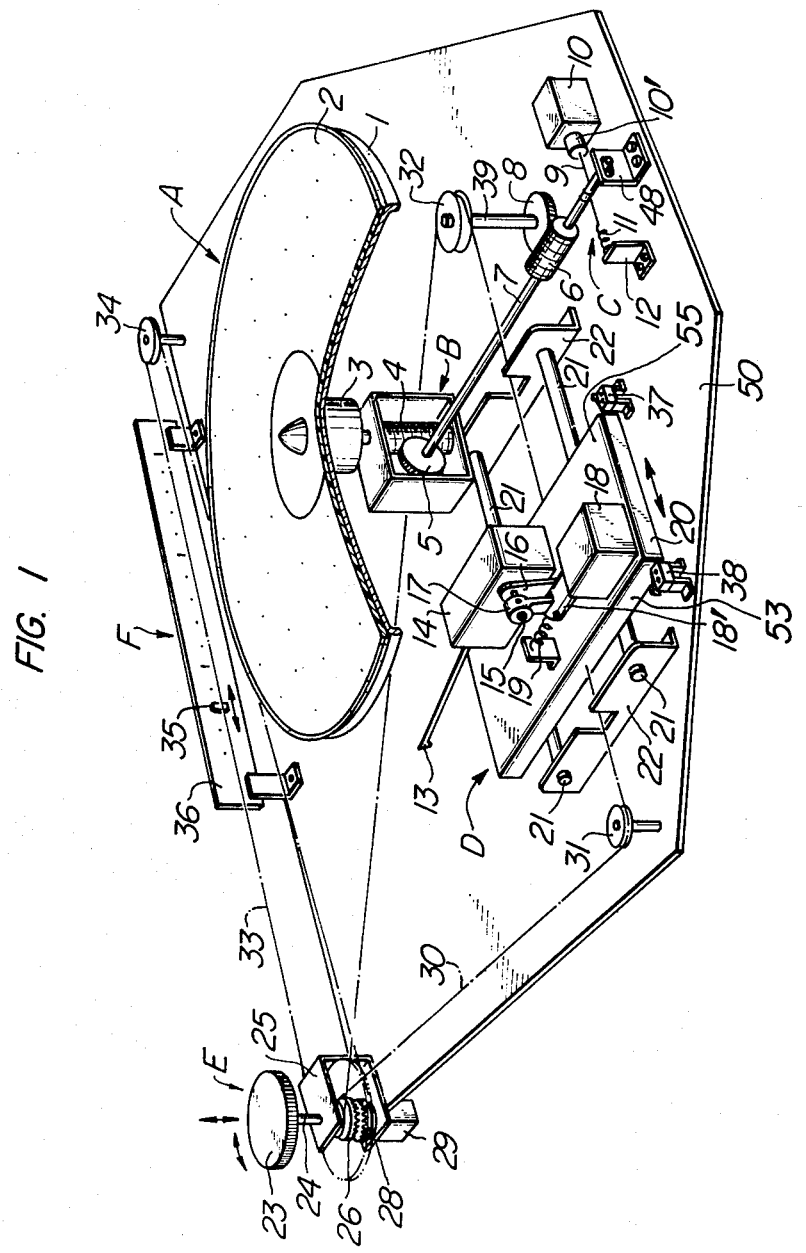
FIG. 1 shows a perspective view illustrating an entire view of one embodiment of the present invention.

Referring to FIG. 1, section A shows a unit for rotating a disk-shaped recording medium 2 in which numeral 1 denotes a turn-table and 3 denotes a motor for driving the turn-table 1.

Section B shows a reduction gear unit in which a worm 4 is fitted onto the end of a driving shaft of the motor 3 and meshes with a worm wheel 5 mounted onto a horizontal shaft 7.

Section C shows a clutch unit in which a worm 6 is fixed to the horizontal shaft 7 and adapted to engage with or disengage from a worm wheel 8. In order to obtain this clutching operation, the horizontal shaft 7 is supported at one end by a self-aligning bearing (not shown) while the other end is slidably and rotatably supported by a bearing 48 having a horizontally extending elongated slot.

A cord 9 is loosely wound around the shaft 7 intermediate thereof, and connected at one end to a plunger 10' of a solenoid 10 and at the other end to one end of a spring 11. A pulling of shaft 7 via cord 9 occurs upon energization of solenoid 10, as illustrated in FIG. 1. The loose winding of the cord 9 permits rotation of shaft 7 without winding up the cord. Numeral 12 denotes a bracket to which the other end of the spring 11 is attached.

Section D shows a detecting unit which moves horizontally along the recording medium 2 at a constant speed when the recording medium 2 rotates during reproduction. Numeral 13 denotes a pickup which is supported by a pickup holder 14 swingably mounted to the detecting unit through a shaft 15 and a bearing 16. Numeral 17 denotes a lever fixed at one end onto a shaft 15, and pivotably connected to a plunger 18' of a solenoid 18. Numeral 19 denotes spring coupled to the plunger 18'. A base 20 slides on guide rods 21 supported by brackets 22.

Figure 2:
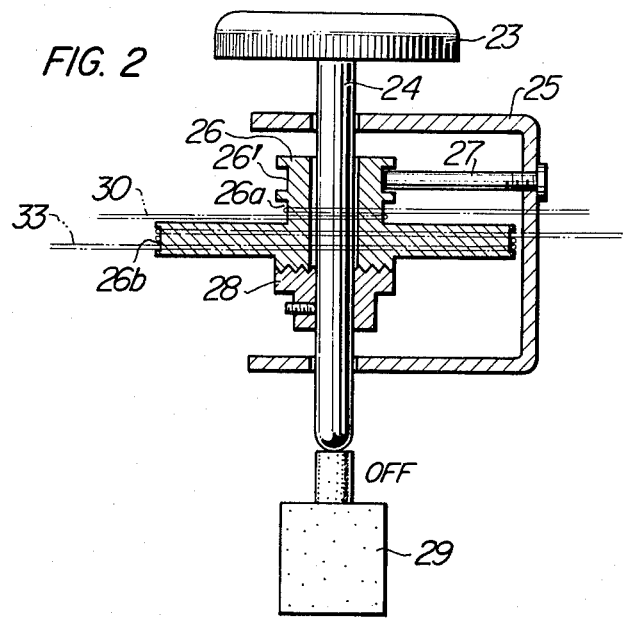
FIGS. 2 and 3 show sectional views of major portions of FIG. 1.

Section E shows a control unit which is a characteristic feature of the present invention. As shown in FIG. 2, a control knob 23 is integrally incorporated with a shaft 24 which is rotatably and axially slidably held by a frame 25 fixed to the control unit E.

Figure 3:
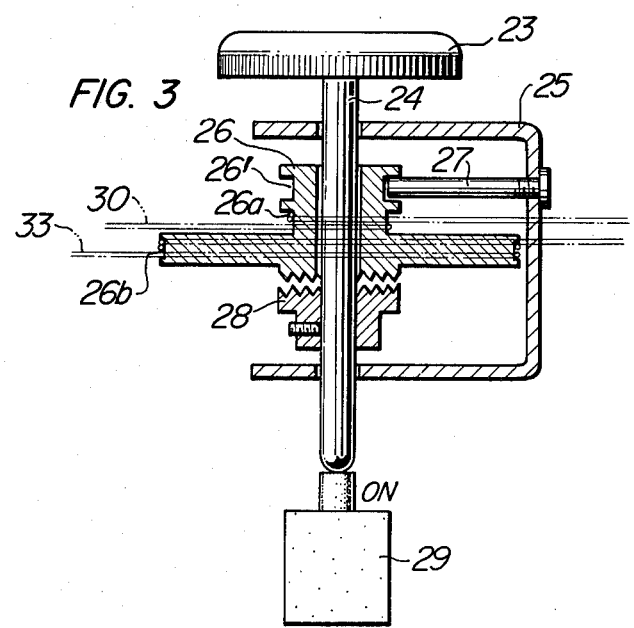

Numeral 26 denotes a clutch follower loosely fitted onto the shaft 24. The upper annular groove 26' of the follower 26 receives one end of a pin 27 having the other end fixed to the frame 25. The pin 27 holds the clutch follower 26 in a given vertical position but allows the latter to freely rotate around the shaft 24. The clutch follower 26 has a middle annular groove 26a of a smaller diameter and a lower annular groove 26b of a larger diameter. Numeral 28 denotes a clutch drive fixed to the shaft 24. Numeral 29 denotes a mechanical push on-off switch which normally biases the shaft 24 as well as the control knob 23 upward so as to couple the clutch drive 28 with the clutch follower 26. Switch 29 is of the type which, when pushed on, retains a reduced plunger height until pushed off again, as shown in FIGS. 2 and 3. Numeral 30 denotes a looped cord wound around the groove 26a of the clutch follower 26, as shown in FIG. 2, pulleys 31 and 32 as shown in FIG. 1. Both ends of the rope 30 are respectively connected to the forward and after ends of the base 20 of the detecting unit D.

A rope 33 is wound around the groove 26b and runs around a pulley 34 to form a closed loop. The cord 33 carries an indicating needle 35 which cooperates with a scale plate 36.

Numerals 37 and 38 denote position sensing switches for the detecting unit base 20, which are fixed to a base plate 50 of the reproducing apparatus. Numeral 39 denotes a speed reduction shaft to which the pulley 32 is fixed.

The operation of the recording apparatus will now be explained.

When the pickup 13 is in a position outside of the turn-table 1; that is, when the after end 53 of the detecting unit base 20 pushes the switch 38 to open the same while the forward end 55 thereof is away for the switch 37 allowing it to close. As a result, a power supply 57 for the entire reproducing apparatus or for the motor 3 is turned-off and the motor 3 stops.

Figure 4:
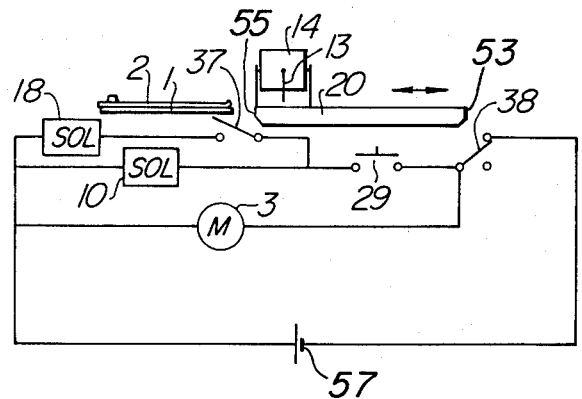
FIG. 4 shows a circuit diagram of a control circuit.

When the recording apparatus is in this condition, a recording medium 2 may be loaded on the turn-table 1. Under the position shown in FIG. 2 (hereinafter referred to "second position"), the clutch drive 28 engages with the clutch follower 26. In this state, when an operator turns the control knob 23, the clutch follower 26 which is driven by drive 28 drives the cord 30 so that the detecting unit base 20 is horizontally moved along the recording medium 2. With reference to FIG. 4, when the base 20 is moved away from the switch 38, the latter closes and supplies power to rotate the motor 3. When the pickup 13 comes to a position inside of a recording surface in the recording medium 2, the base 20 depresses the switch 37 closing the same to establish a current path which causes actuation of the solenoid 18 as shown in FIG. 4. However, the solenoid 18 is not yet energized at this stage since the switch 29 is still turned-off, i.e., opened.

Simultaneously with movement of pickup 13 which is carried by base, indication needle 35 is carried by the cord 33 thereby indicating the position of pickup 13. The reproducing apparatus is now in the ready-for-reproduction position. Thereafter, when an operator depresses the control knob 23 so that it takes a lower position (FIG. 3) (hereinafter referred to "first position"), the switch 29 is depressed and holds its depressed position while turning on, i.e., closing its contacts. As a result of the turn-on of switch 29' as shown in FIG. 4, the solenoid 10 is energized to actuate the clutch unit C. Thus, the motor 3 transmits its drive force to the pulley 32 fixed to the speed reduction shaft 39 through the reduction gear unit B and the clutch unit C to rotate the pulley 32 and drive the cord 30 wound around the pulley 32. The detecting unit base 20 now starts to horizontally move along the recording medium 2 at a constant speed. When the switch 29 is also depressed, the solenoid 18 is energized by virtue of switch 37 being closed so as to cause the pickup holder 14 to swing down through the lever 17, thereby bringing the pickup 13 into contact with the recording medium 2.

The apparatus is thus in the reproducing position. Assuming that the ratio of the diameters of the middle annular groove 26a and the lower annular groove 26b is 1:3, the indication needle 35 moves at a speed three times as fast as the speed of the horizontal movement of the pickup 13. In other words, the displacement of the indication needle 35 on the scale plate 36 may be enlarged by 3 times relative to the displacement of the pickup 13. In this manner, an optimum size of the scale plate 36 may be chosen to facilitate its reading.

In the reproduction mode, even if the operator turns the control knob 23 erroneously or accidentally, the turning force is not transmitted to the pickup unit base 20 through the cord 30 because the clutch drive 28 is disengaged from the clutch follower 26 because shaft 24 rests on switch 29 which holds its depressed condition, as shown in FIG. 3. Therefore, the pickup 13 does not move transversely across the recording surface. During the reproduction, when the control knob 23 is depressed again, the movement of switch 29 returning to its off position, as shown in FIG. 2, causes upward movement of shaft 24 and the clutch drive 28 engages with the clutch follower 26 as the switch 29 is turned-off as shown in FIG. 4. Consequently, solenoid 18 releases and spring 19 causes the pickup 13 to swing upward away from the recording medium 2 while solenoid 10 releases and spring 11 disengages worm 6 and worm wheel 8 by pulling shaft 7. As a result, the detecting unit base 20 comes to a stop.

The motor 3, however, still continues to rotate because switch 28 remains closed. When the control knob 23 is again depressed while the pickup 13 remains in its up position, the pickup 13 again swings down so that reproduction is resumed from the previous reproducing position on the recording medium 2. In this manner, a pause operation can be provided to the reproducing apparatus. If the operator turns the control knob 23 in this pause state to move the pickup 13 in the reverse direction to that of the reproducing movement, the power supply will be turned-off when the detecting unit base 20 reaches and depresses the switch 38. At this time, the pickup 13 is in a position outside of the recording medium 2. As the result, the motor 3 ceases so as to allow the recording medium 2 to be removed from the turn-table 1. The apparatus is now in a complete rest position.

As described hereinabove, according to the present invention, the turn-on and turn-off of the power supply, and the vertical and horizontal movements of the pickup for positioning the pickup 13 for reproduction can be smoothly and reliablly carried out by turning and depressing a single control knob 23 without damaging the pickup 13 and the recording medium 2.

Further, according to the present invention, one can easily see whether the reproducing apparatus is in a reproduction mode or not, by observing the control knob 23, as described in detail hereinbelow.

Figure 5A:
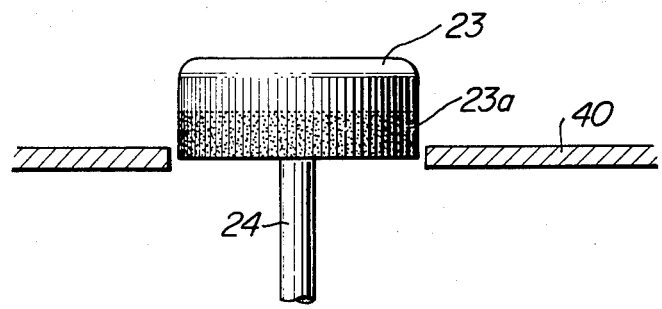
FIG. 5a shows a control knob in one position.
Figure 5B:
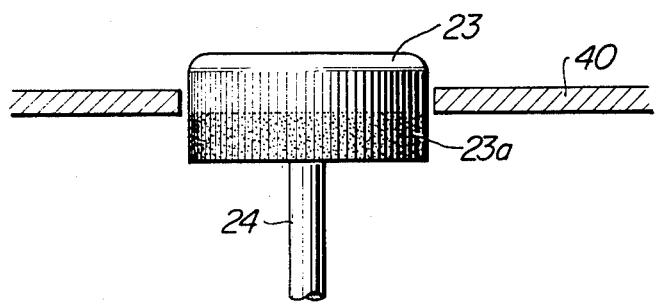
FIG. 5b shows a similar view to FIG. 5a, when the control knob takes another position.

Referring FIGS. 5a and 5b, the control knob 23 is color-coded so as to clearly distinguish the upper and lower portions thereof. The lower portion 23a of the control knob 23 is colored so as to clearly distinguish from the surrounding portions of the reproducing apparatus. Further, this lower portion 23a is adapted to be completely hidden below a cabinet board 40 of the apparatus when the control knob 23 is depressed to take the second position, as shown in FIG. 5b. Thus, one can easily see the status of the reproducing apparatus by looking to see whether the colored lower portion 23a of the control knob 23 is observable or not.

While the present invention has been described in its preferred embodiments, obviously modifications and variations are possible in light of the above teachings, without departing from its spirit and scope.

We claim:

1. A reproducing apparatus for a disk-shaped recording medium, comprising:
    means for rotating a disc-shaped recording medium;
    a base horizontally movable in a plane parallel to said disk-shaped recording medium;
    means carried by said movable base for detecting recording signals from said disk-shaped recording medium;
    means for selectively causing said detecting means to engage with and disengage from said disk-shaped recording medium;
    a control shaft having a control knob attached at one end thereof, said control shaft being rotatable and axially movable in association with corresponding rotating and axial movements of said control knob;
    means for causing said control shaft to become selectively situated in one of a first and second axial positions upon axial movement of said control knob;
    a first clutch means including a drive member and a driven member, said drive member being rotated with the rotation of said control shaft by rotation of said control knob and coupled with said driven member when said control shaft member is situated in said second position;
    means for converting the rotatory movement of said driven member into a linear movement and for transmitting the linear movement to said movable base;

a second clutch means for selectively engaging said means for rotating with said converting and transmitting means so that rotary movement of said means for rotating is converted to linear movement and applied to linearly move said base through said converting and transmitting means;

a first switch means for closing a contact path when said control shaft is situated in said first position;

a first electrical circuit, established through the closed contact path of said first switch means, for actuating said engaging and disengaging means to engage said detecting means with said disc-shaped recording medium; and, a second electrical circuit, established through the closed contact path of said first switch means for actuating said second clutch means so as to engage said means for rotating with said converting and transmitting means.

2. A reproducing apparatus as set forth in claim 1, wherein said driven member is formed with an annular groove in the peripheral surface thereof, and said converting and transmitting means includes at least one pulley and a cord which is passed around said annular groove and said pulley and which is connected at both ends to respective opposite sides of said movable base.

3. A reproducing apparatus as set forth in claim 1, wherein said first switch means includes a push-on/push-off switch which functions as said means for causing said control shaft to become situated in a first and second positions and which cooperates with said control shaft so as to selectively hold said drive member and said driven member in a coupling or discoupling state in association with alternate axial movements of said control shaft caused by successive push down operations of said control knob.

4. A reproducing apparatus as set forth in claim 1, further comprising a second switch means having contacts which are closed by the movement of said movable base away from a position where said detecting means is located above said disc-shaped recording medium, the contacts of said second switch means being electrically connected in series with the contacts of said first switch and supplying, when closed, electrical power from a power source to said reproducing apparatus.

5. A reproducing apparatus as set forth in claim 1, further comprising a cabinet board defining an aperture in which said control knob axially moves, said control knob having a color band in its lower peripheral surface which projects from said aperture and is visible when said control shaft is in said second position.

* * * * *